United States Patent
Boenisch et al.

(10) Patent No.: US 10,585,736 B2
(45) Date of Patent: *Mar. 10, 2020

(54) INCREMENTAL DUMP WITH FAST REBOOT

(71) Applicant: International Business Machines Corporation, Armonk, NY (US)

(72) Inventors: Volker Boenisch, Boeblingen (DE); Reinhard T. Buendgen, Tübingen (DE); Franziska Geisert, Altdorf (DE); Michael Holzheu, Tübingen (DE); Jakob C. Lang, Tübingen (DE); Angel Nunez Mencias, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/665,454

(22) Filed: Aug. 1, 2017

(65) Prior Publication Data
US 2019/0042346 A1 Feb. 7, 2019

(51) Int. Cl.
*G06F 11/00* (2006.01)
*G06F 11/07* (2006.01)
(Continued)

(52) U.S. Cl.
CPC ............ *G06F 11/0778* (2013.01); *G06F 1/30* (2013.01); *G06F 11/0724* (2013.01);
(Continued)

(58) Field of Classification Search
CPC .... G06F 1/30; G06F 11/0724; G06F 11/0778; G06F 11/0793; G06F 11/1417; G06F 11/1441; G06F 11/2015
See application file for complete search history.

(56) References Cited

U.S. PATENT DOCUMENTS 7,509,521 B2  3/2009  Iwakura et al.
9,229,820 B2  1/2016  Kondou
(Continued)

OTHER PUBLICATIONS

"HP-UX 11i v3 Crash Dump Improvements" Jan. 2007. Hp Invent. pp. 18.
(Continued)

*Primary Examiner* — Joshua P Lottich
(74) *Attorney, Agent, or Firm* — Edward P. Li

(57) ABSTRACT

Methods and systems for executing dumping of main memory content and CPU states and for an adaptive boot. The methods and the systems provide a configuration list of the computer system comprising a pre-defined set of dedicated resources for the dumping, provide threshold values for a pre-defined set of minimum resources for executing a reboot of the computer system, assign the pre-defined set of the dedicated resources for executing the dumping, start the dumping, release ones of the dedicated resources after content of the ones of the dedicated resources has been dumped, start a reboot process of the computer system in response to determining that the ones of the dedicated resources exceeds the threshold values for the pre-defined set of the minimum resources for executing the reboot process, and continue to release others of the dedicated resources to the reboot process until the dumping is completed.

13 Claims, 15 Drawing Sheets

(51) Int. Cl.
*G06F 11/14* (2006.01)
*G06F 11/20* (2006.01)
*G06F 1/30* (2006.01)

(52) U.S. Cl.
CPC ...... *G06F 11/0793* (2013.01); *G06F 11/1417* (2013.01); *G06F 11/1441* (2013.01); *G06F 11/2015* (2013.01); *G06F 11/079* (2013.01); *G06F 2201/805* (2013.01); *G06F 2201/815* (2013.01)

(56) References Cited

U.S. PATENT DOCUMENTS

| | | | |
|---|---|---|---|
| 9,298,472 B2 | 3/2016 | Kohiga | |
| 9,298,536 B2 | 3/2016 | Buendgen et al. | |
| 9,430,415 B2 | 8/2016 | Chamberlain et al. | |
| 9,436,537 B2 | 9/2016 | Desai et al. | |
| 9,442,790 B2 | 9/2016 | Nagahama et al. | |
| 9,710,321 B2 | 7/2017 | Zhao | |
| 2002/0029359 A1* | 3/2002 | Kiyoi | G06F 11/073 714/45 |
| 2003/0145157 A1* | 7/2003 | Smullen | G06F 11/1441 711/104 |
| 2007/0061613 A1 | 3/2007 | Ohashi | |
| 2008/0209264 A1* | 8/2008 | Morse | G06F 11/0778 714/6.32 |
| 2011/0154133 A1* | 6/2011 | Ganti | G06F 11/0712 714/54 |
| 2015/0006963 A1* | 1/2015 | Geisert | G06F 11/0778 714/38.11 |
| 2016/0055043 A1* | 2/2016 | Chikabelapur | G06F 11/079 714/37 |
| 2017/0192831 A1* | 7/2017 | Abrams | G06F 11/0706 |
| 2018/0203753 A1* | 7/2018 | Chamberlain | G06F 11/079 |
| 2019/0042347 A1 | 2/2019 | Boenisch | |

OTHER PUBLICATIONS

Corbet "firmware-assisted-dump.txt" LWN.net Jul. 2011. Posted Mar. 28, 2012. pp. 5.<http://lwn.net/Articles/488132/>.

Maheshsal "Firmware assisted dump support on Power Linux systems—News around the Linux on Power Community" Dec. 3, 2012. pp. 4.

Mell et al. "The NIST Definition of Cloud Computing Recommendations of the National Institute of Standards and Technology" Special Publication 800-145. Sep. 2011. Gaithersburg, MD.

Appendix P List of IBM Patents or Applications Treated as Related. Dated Nov. 11, 2017. Two pages.

Boenisch et al. Original U.S. Appl. No. 15/809,359, filed Nov. 10, 2017.

\* cited by examiner

INCREMENTAL DUMP WITH FAST REBOOT

BACKGROUND

The present invention relates generally to executing dumping, and more particularly to dumping of a main memory content and CPU states. The invention relates further to an adaptive boot process.

Today's computing centers (in particular cloud computing centers and also hybrid approaches) rely heavily on virtual machines as a key delivery mechanism for providing ad-hoc IT (information technology) resources for pilot projects, testing purposes and also for production environments. In such a context, it is also paramount to be able to analyze failed virtual machines and to perform a root cause analysis. A basis for such an analysis is a dump—i.e., a stored status or statuses of processing units and adapters as well as the content of the memory at the moment of failure or just before—if the system (virtual or real) crashes. On the other side, it may also be required to reboot the crashed system as fast as possible again in order to have a minimal impact on the operation of the IT center.

The time for dumping huge systems (including huge virtual machines, logical partitions (LPARs), etc.) can take several hours and thus leads to a considerable outage of the system if the dump must be completed before resources of the failed system can be reused and the failed operating system can be rebooted. It may be noted that a logical partition, commonly called an LPAR, may be a subset of a computer's hardware resources, virtualized as a separate computer. In fact, a physical machine may be partitioned into multiple logical partitions, each hosting a separate operating system.

Another drawback of traditional systems is that it is not possible to boot while the dump process is running. Therefore, it may be required to provide twice the originally memory needed by the system.

SUMMARY

In one aspect, computer-implemented method for executing dumping of main memory content and central processing unit (CPU) state values of a computer system is provided. The computer-implemented method comprises providing a configuration list of the computer system, wherein the computer system comprises a pre-defined set of dedicated resources for executing the dumping. The computer-implemented method further comprises providing threshold values for a pre-defined set of minimum resources for executing a reboot of the computer system. The computer-implemented method further comprises loading the configuration list and storing CPU states of a plurality of CPUs and I/O adapter states of a plurality of I/O adapters in a spare memory region. The computer-implemented method further comprises assigning the pre-defined set of the dedicated resources for executing the dumping, starting the dumping, and releasing ones of the dedicated resources after content of the ones of the dedicated resources has been dumped. The computer-implemented method further comprises starting a reboot process of the computer system, in response to determining that the ones of the dedicated resources exceeds the threshold values for the pre-defined set of the minimum resources for executing the reboot process. The computer-implemented method further comprises continuing to release others of the dedicated resources to the reboot process, after content of the others of the dedicated resources has been dumped to the reboot process, until the dumping is completed.

In another aspect, a computer-implemented method for executing an adaptive boot for a computer system is provided. The computer-implemented method comprises providing a configuration list for the computer system, wherein the computer system comprising a pre-defined set of minimum resources for executing the adaptive boot of the computer system. The computer-implemented method further comprises starting the adaptive boot, in response to determining that the minimum resources are available for a boot process. The computer-implemented method further comprises allocating continuously further resources to the boot process, until a full configuration according to the configuration list has been reached.

In yet another aspect, a system for executing dumping of a main memory content and central processing unit (CPU) state values of a computer system is provided. The system comprises a configuration storage configured for storing a configuration list of the computer system, wherein the computer system comprises a pre-defined set of dedicated resources for executing the dumping. The system further comprises the configuration storage further configured for providing threshold values for a pre-defined set of minimum resources for executing a reboot of the computer system. The system further comprises a spare memory region configured for storing the configuration list and storing CPU states of a plurality of CPUs and I/O adapter states of a plurality of I/O adapters. The system further comprises an assigning unit configured for assigning the pre-defined set of the dedicated resources for executing the dumping. The system further comprises a dumping module configured for starting the dumping. The system further comprises a releasing module configured for releasing ones of the dedicated resources after content of the ones of the dedicated resources has been dumped. The system further comprises a reboot module configured for starting a reboot process of the computer system, in response to determining that the ones of the dedicated resources exceeds the threshold values for the pre-defined set of the minimum resources for executing the reboot process. The system further comprises the releasing module further configured for continuing to release others of the dedicated resources to the reboot process after content of the others of the dedicated resources has been dumped to the reboot process until the dumping is completed.

DETAILED DESCRIPTION

Figure 1:
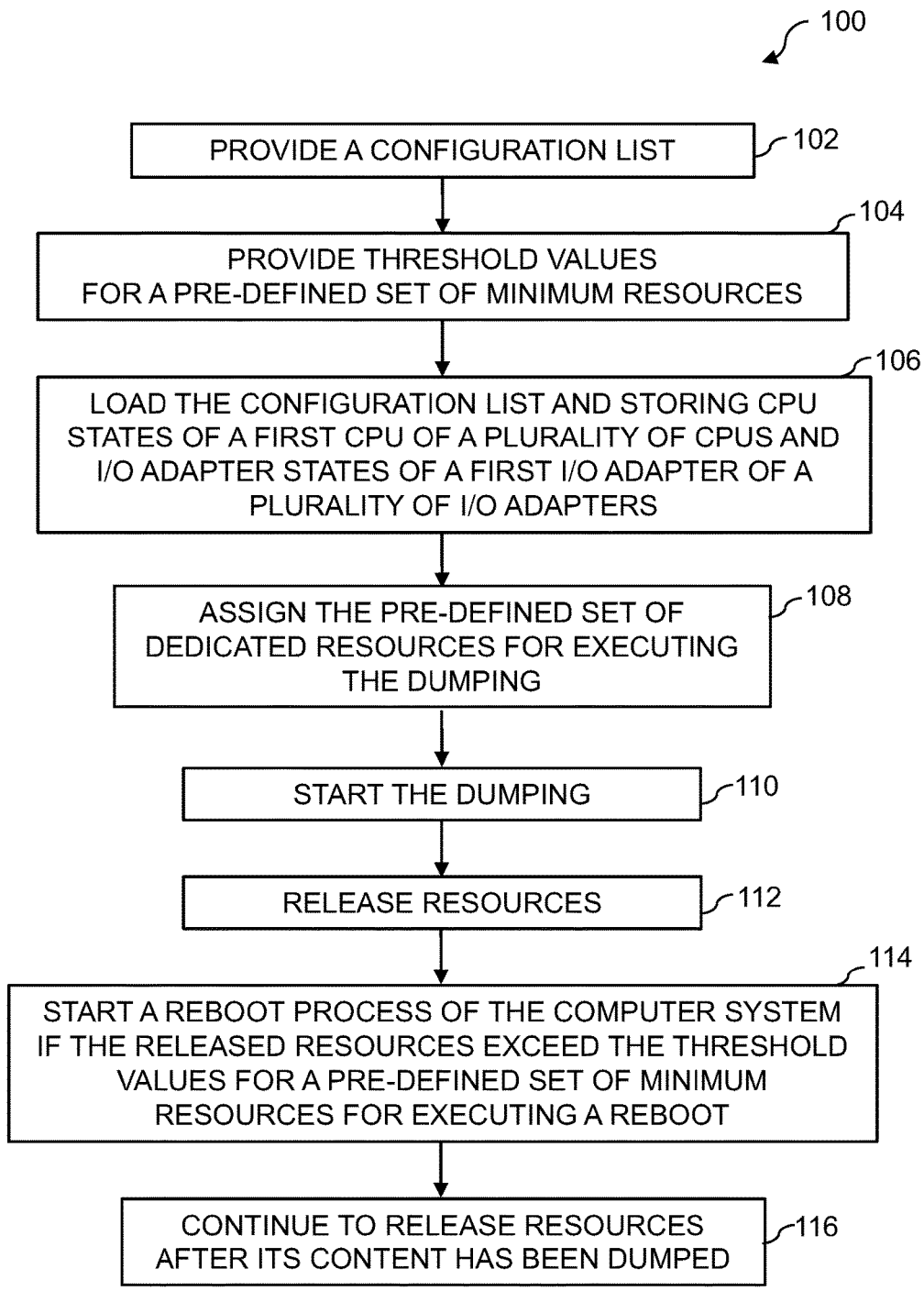
FIG. 1 is a block diagram showing operational steps of a method for executing dumping of main memory content and CPU states, in accordance with one embodiment of the present invention.

In the context of this description, the following conventions, terms and/or expressions may be used.

The term "dumping" (also named dump, system dump, kernel dump, or memory dump) may include the recorded state of the working or main memory of a computer program at a specific time, generally when an operating system or system (e.g., virtual machine) has crashed or otherwise terminated abnormally. In practice, other key pieces of program state are usually dumped at the same time, including the processor registers, which may include the program counter and stack pointer, memory management information, and other processors, adapter and operating system flags and information. Dumps are often used to assist in diagnosing and debugging errors in computer programs.

The term "configuration list" may denote specifications of resources like memory amount (measured in megabytes (MB) or gigabytes (GB)), required kind, identifiers and number of I/O adapters, and/or CPU resources (e.g., number of cores). Thus, the configuration list may comprise all required (in particular additionally minimum) resources for executing the dumping process or for executing the adaptive reboot process. These minimum resources may also be denoted as minimum "dedicated resources".

The term "reboot" may denote the process by which a running computer system may be restarted, either intentionally or unintentionally. Reboots may be cold (alternatively known as hard) where the power to the system may physically be turned off and back on again, causing an initial boot of the machine. Reboots may be also warm (alternatively known as soft) where the system may restart without the need to interrupt the power. The term "reboot" may also be used in the context of virtual machines instead of physical computer systems. In this case, the reboot may also comprise making the resources available which may be required for the operating/execution of the virtual machine. In the context of this application, it may be instrumental to differentiate between minimum required resources and resources defined for a continued operation of the virtual machine.

The term "spare memory region" may denote a dedicated memory segment outside of the virtual machine causing a dump. It will typically reside in the system firmware or a hypervisor memory not accessible to virtual machines.

The term "memory segment" may denote a continuous amount of memory cells including a continuous address room. Different memory segments may be chained together to build a larger continuous address room.

The term "adaptive boot" or "adaptive boot process" may denote one of the inventive concepts proposed in this document. A specific characteristic of the adaptive boot process may be to start the boot process even if not all resources, defining the full functioning virtual machine, may be available. Hence, the adaptive boot process may guarantee that the boot process already starts if a minimum set of required resources may be available.

The term "virtual machine (VM)" may denote an emulation of a computer system. Virtual machines may be based on computer architectures and may provide functionality of a physical computer. Their implementations may involve specialized hardware, software, or a combination. The VM may also be denoted as logical partition (LPAR). It may also be possible to execute one or more LPARs as a subcomponent of a higher level LPAR. Typically, virtual machines are executed using a hypervisor or virtual machine manager (VMM).

In this document, cloud computing services, cloud computing environments, virtual machines and LPAR (Logical PARtitions) are mentioned many times. Such services may belong to cloud computing in general, which may be a model for enabling convenient, on-demand network access to a shared pool of configurable computing resources (e.g., networks, servers, storage, applications, and services) that may be rapidly provisioned and released with minimal management effort or service provider interaction. This cloud model may promote availability and may be composed of five essential characteristics, three service models, and four deployment models.

Essential Characteristics of cloud computing comprise:

(i) On-demand self-service: A consumer can unilaterally provision computing capabilities, such as server time and network storage, as needed automatically without requiring human interaction with each service provider.

(ii) Broad network access: Capabilities are available over the network and accessed through standard mechanisms that promote use by heterogeneous thin or thick client platforms (e.g., mobile phones, laptop computers, tablet computers, and PDAs).

(iii) Resource pooling: The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

(iv) Rapid elasticity: Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

(v) Measured service: Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud computing used comprise:

(i) Cloud Software as a Service (SaaS): The capability provided to the consumer is to use the provider's applications running on a cloud infrastructure. The applications are accessible from various client devices through a thin client interface such as a Web browser (e.g., Web-based e-mail). The consumer does not manage or control the underlying cloud infrastructure including network, servers, operating systems, storage, or even individual application capabilities, with the possible exception of limited user-specific application configuration settings.

(ii) Cloud Platform as a Service (PaaS): The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

(iii) Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:

(i) Private cloud. The cloud infrastructure is operated solely by an organization. It may be managed by the organization or a third party and may exist on premise or off premise.

(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.

(iii) Public cloud. The cloud infrastructure is made available to the general public or a large industry group and is owned by an organization selling cloud services, e.g., a cloud service provider.

(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software may take full advantage of the cloud paradigm by being service-oriented with a focus on statelessness, low coupling, modularity, and semantic interoperability.

The present invention for executing dumping of main memory content and CPU states offers multiple advantages and technical effects.

The present invention for executing the dumping of the main memory content and central processing unit state values of a computer system may particularly be useful for large computer systems hosting a plurality of virtual machines or containers. The hypervisor may (temporarily) partition existing virtual machines into sub-virtual-machines. In a case of a very large virtual machine (e.g., 1 TB of main memory or even more) crashes, a dump may require very long time (e.g, hours). However, if the reboot waits until the dump is finished completely, a new replacement VM may not be restated for a longer time.

The present invention may reduce the amount of resources required in order to execute the dump and/or the reboot. An instrumental concept for achieving this is to assign the required resources in smaller portions to the active process (i.e., dump and reboot) so that only a small amount of additional resources may be required to start the specific active process. For that, the here described concept proposes to manage a pre-defined set of minimal dedicated resources for executing the dump. The same may be applied to the adaptive boot process. That way, the active process (i.e., dump or boot) may be started as soon as the minimum required amount of resources may be available. The system may not be required to wait having required resources for the execution of the complete system available at one point in time.

This may increase the overall performance of the underlying hardware system because waiting times for making all required resources for the related processes available at one point in time may be eliminated. Instead, the related processes may be started as soon as a minimum amount of resources (which may be predefined) is available. Hence, the overall usage of available resources may be increased and optimized. The user experience may be enhanced because either the required dump may be available earlier or a new virtual machine may be started faster. The ability to start the reboot process before all resources are dumped will minimize outage times, in particular it avoids that outage times are directly related to the size of the main memory of the system to be dumped.

In the following, additional embodiments of the present invention described within this document will be explained.

According to one embodiment of the present invention for executing dumping, the resources (in particular dedicated and released resources as well as those required for a reboot) may be selected out of the group comprising a memory segment, a CPU core, and an I/O adapter. Such components may also define the bare minimum of a functional virtual machine.

According to another embodiment of the present invention for executing dumping, the computer system may be a second virtual machine being executed as a sub-virtual-machine in a first virtual machine. Thus, the concept of an LPAR as part of another LPAR may be used advantageously.

According to yet another embodiment of the present invention for executing dumping, assigning the pre-defined set of dedicated resources for executing the dumping may comprise releasing the pre-defined set of resources of a first virtual machine from a second virtual machine, and starting a third virtual machine within the first virtual machine for executing the dumping of the second virtual machine. Thus, the complete set of resources originally being dedicated to the second virtual machine may be split to (a) being assigned to the third virtual machine while (b) the remaining part of the original resources of the second virtual machine may still be assigned to the second virtual machine.

A further embodiment of the present invention for executing dumping may comprise storing CPU states of the plurality of CPUs (in particular of a second virtual machine) without states of a first CPU as well as I/O adapter statuses without the statuses of a first adapter of the first virtual machine to the spare memory region under control of the dumping being executed in the second virtual machine. Thus, available resources may be used in a better way than traditional dumping processes.

According to one additional embodiment of the present invention for executing dumping, a second and a third virtual machine share a central processing unit, in particular a virtual CPU of a first virtual machine. As already suggested above, those resources no longer required for the second virtual machine may be reused already for the third virtual machine even if the processes related to the second virtual machine (i.e., dumping) may not be finished completely.

According to yet another embodiment of the present invention for executing dumping, the rebooting and the dumping may be executed in parallel. This may be a consequence of starting the rebooting already with resources no longer required because the content may have been dumped already. These resources may not sit idle but may be reassigned and repurposed for the next logical step after the dumping, i.e., the rebooting.

Yet another embodiment of the present invention for executing dumping may comprise dissolving a second virtual machine after the dumping is complete. This may be a consequential step after the dump has been performed in order to release no longer required resources.

According to yet another embodiment of the present invention for executing the adaptive boot process, the minimal resources comprise a minimal amount of memory segments. Additionally, the method for executing the adaptive boot process may comprise constructing a linear address space from the memory segments allocated to the boot process. If memory segments from different areas of a larger address space is released and reassigned in an unpredictable process, a reassignment of logical addresses may guarantee to have a continuous address space through which a program counter may walk in order to execute a program from the start to the end.

Yet another embodiment of the present invention for executing the adaptive boot process may comprise resetting each memory cell of the linear address space before starting the adaptive boot. This may allow a starting with a defined status of the memory cells. One advantage of such an approach may be that also variables, not initialized in a program, may have a defined status. This may help to avoid unnecessary system crashes; it avoids that a new system may have access to left over data of a previous system which can be a security (information leak) issue.

A further embodiment of the present invention for executing the adaptive boot process may comprise starting parallel to the adaptive boot process a clearing process using resources not available to the adaptive boot process. In this case, the clearing process may comprise clearing resources and releasing cleared resources (e.g. memory segments) after being cleared and assigning the cleared resources to the adaptive boot process. In such a case, the clearing process may trigger an event such that the remaining resources may be assigned to the boot process. That way, a defined trigger may indicate the end of the clearing of the resources (i.e., the memory cells) as well as the termination of the related clearing process.

In the following, detailed descriptions of figures will be given. All instructions in the figures are schematic. Firstly, a block diagram of an embodiment of a method for executing dumping of main memory content and CPU states is given. Afterwards, further embodiments, as well as embodiments of a system for executing dumping of main memory content and CPU states, will be described.

FIG. 1 is a block diagram showing operational steps of method 100 for executing dumping of main memory content and CPU states, in accordance with one embodiment of the present invention. Method 100 comprises step 102: providing a configuration list of a computer system including a pre-defined set of dedicated resources for executing the dumping. Method 100 further comprises step 104: providing threshold values for a pre-defined set of minimum resources for executing a reboot of the computer system. Method 100 further comprises step 106: loading the configuration list and storing CPU states of a first CPU of a plurality of CPUs and I/O adapter states of a first I/O adapter of a plurality of I/O adapters in a spare memory region. This may be performed by firmware and not the dumper itself (i.e., dumper program or dumper module). The dumper can use a function provided by the firmware to later dump contents of the spare memory region. The I/O adapters assigned to the dumping program can be used to access a dump medium.

Furthermore, method 100 for executing the dumping comprises step 108: assigning the pre-defined set of the dedicated resources for executing the dumping. Method 100 further comprises step 110: starting the dumping. Method 100 further comprises step 112: releasing a resource (in particular, memory space or cells, CPUs and/or CPU cores, I/O adapters) after their content has been dumped. Method 100 further comprises step 114: starting a reboot process of the computer system if the released resources exceed the threshold values for the pre-defined set of the minimum resources for executing a reboot. Method 100 further comprises step 116: continuing to release other resources to the reboot process after their content has been dumped, until the dumping is completed.

Figure 2:
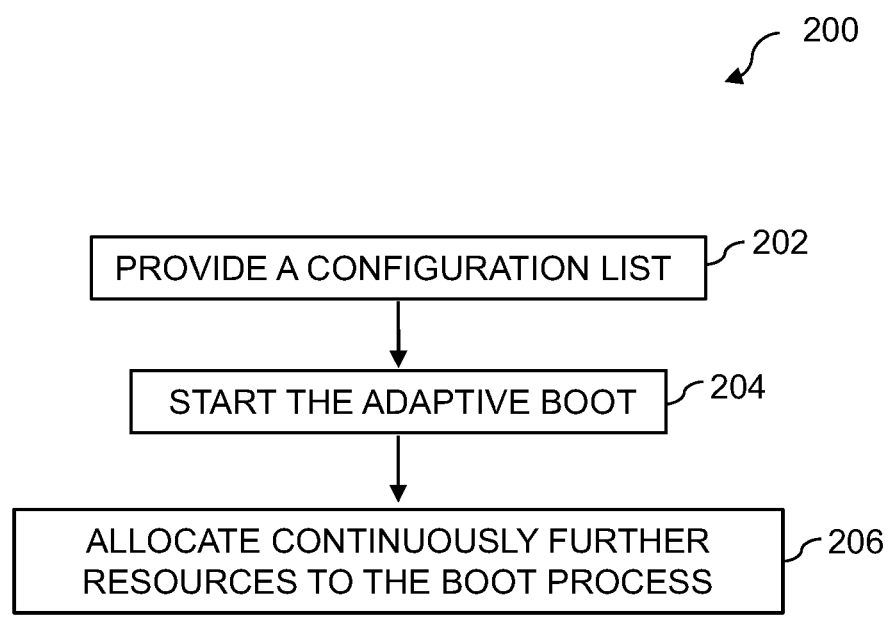
FIG. 2 is a block diagram showing operational steps of a method for executing an adaptive boot for a virtual machine, in accordance with one embodiment of the present invention.

FIG. 2 is a block diagram showing operational steps of method 200 for executing an adaptive boot for a virtual machine, in accordance with one embodiment of the present invention. Method 200 comprises step 202: providing a configuration list for a computer system comprising a pre-defined set of minimum resources for executing the adaptive boot of the computer system. Method 200 further comprises step 204: starting the adaptive boot if the minimum resources are available for a boot process. Method 200 further comprises step 206: allocating continuously further resources to the boot process until a full configuration according the configuration list of the computer system has been reached.

Figure 3:
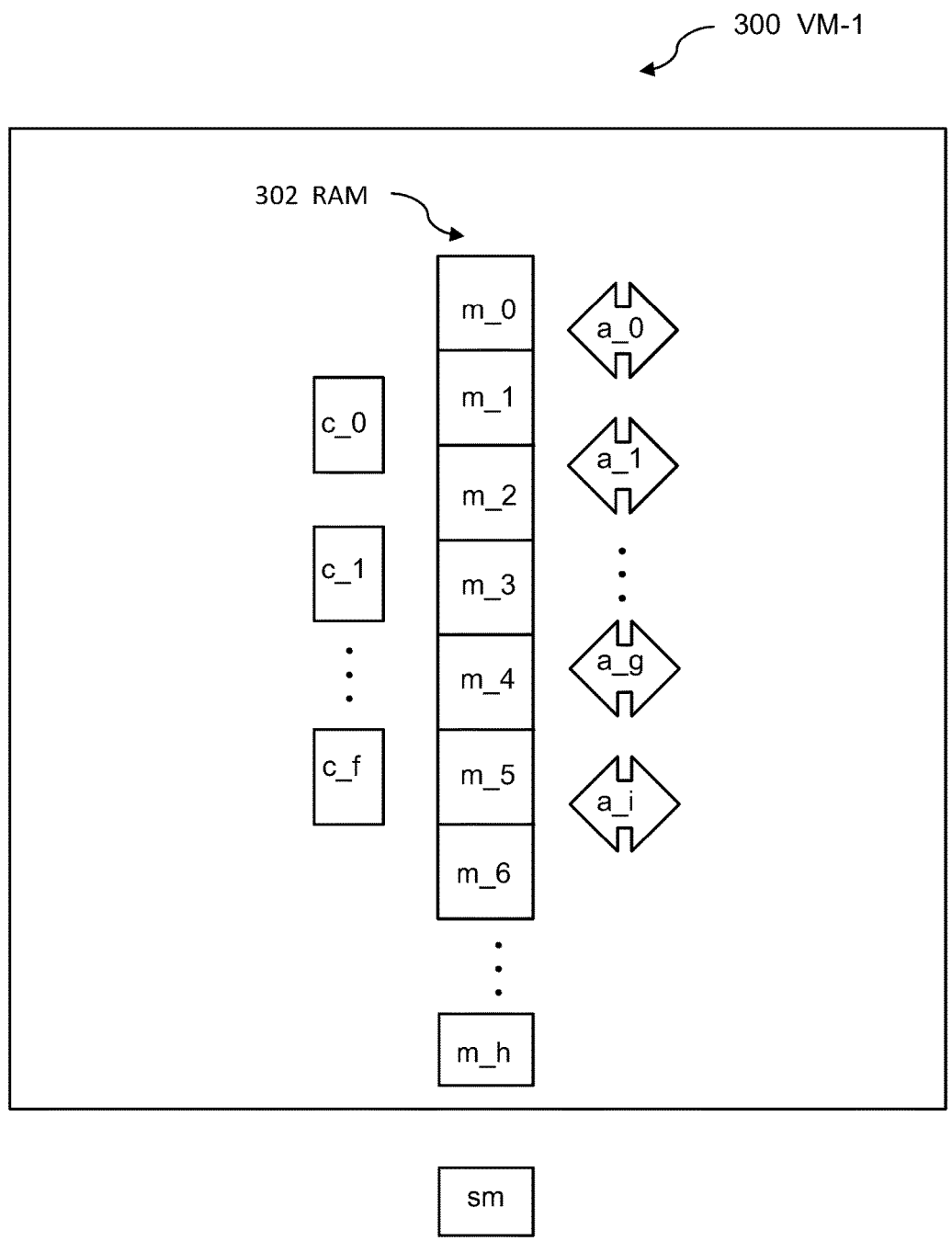
FIG. 3 is a diagram illustrating a virtual machine, in accordance with one embodiment of the present invention.

FIG. 3 is a diagram illustrating virtual machine (VM-1) 300, in accordance with one embodiment of the present invention. RAM (random access memory) 302 is provided as a set of memory segments m_0 to m_h. Additionally, a further memory segment, the spare memory segment sm, is shown which is typically accessible by firmware or it may be another unused part of the virtual machine (VM-1) 300. Additionally and exemplary, a series of CPUs c_0 to c_f are shown as part of virtual machine (VM-1) 300. As usual, the CPUs are configured to execute programs or services being stored in the continuously aligned memory segments m_0 to m_h. I/O (input/output) operations are performed via the exemplary IO adapters a_0 to a_i.

Figure 4:
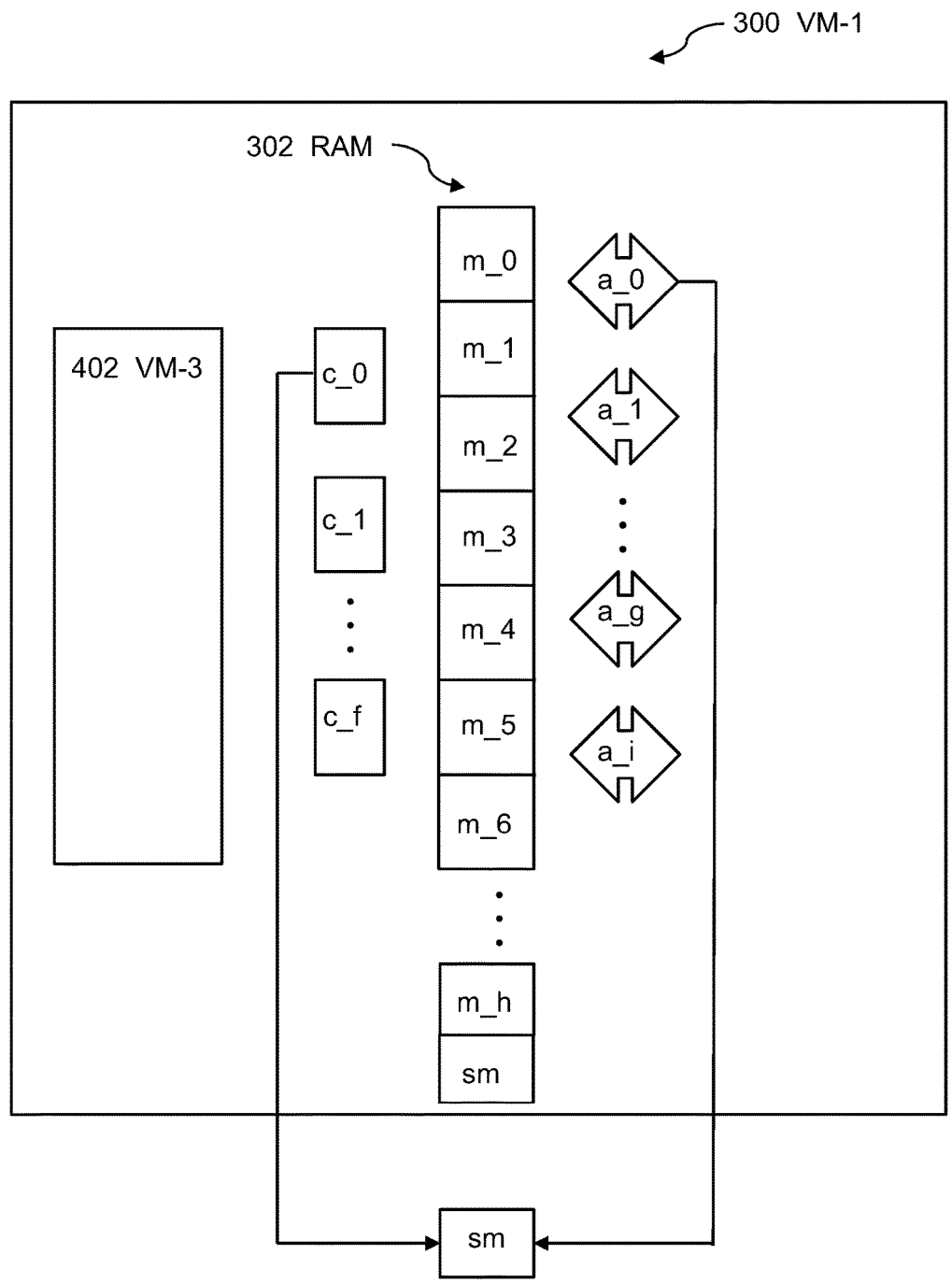
FIG. 4 shows an embodiment for storing a first central processing unit (CPU) status and a first adapter status using firmware as an initial step for the dump, in accordance with the present invention.

FIG. 4 shows an embodiment for storing a first central processing unit (CPU) status and a first adapter status using firmware as an initial step for the dump, in accordance with the present invention. Before that, the spare memory sm is cleared. In particular, the statuses of the CPU c_0 and the adapter a_0 are stored in the spare memory sm.

Right after that or in parallel, sub-virtual machine VM-3 402 without any resources is created within virtual machine VM-1 300. Thus, only the framework for the virtual machine or LPAR may be defined in sub-virtual machine VM-3 402. This third virtual machine VM-3 402 will be the replacement of a crashed VM (VM-3 502 shown in FIG. 5).

Figure 5:
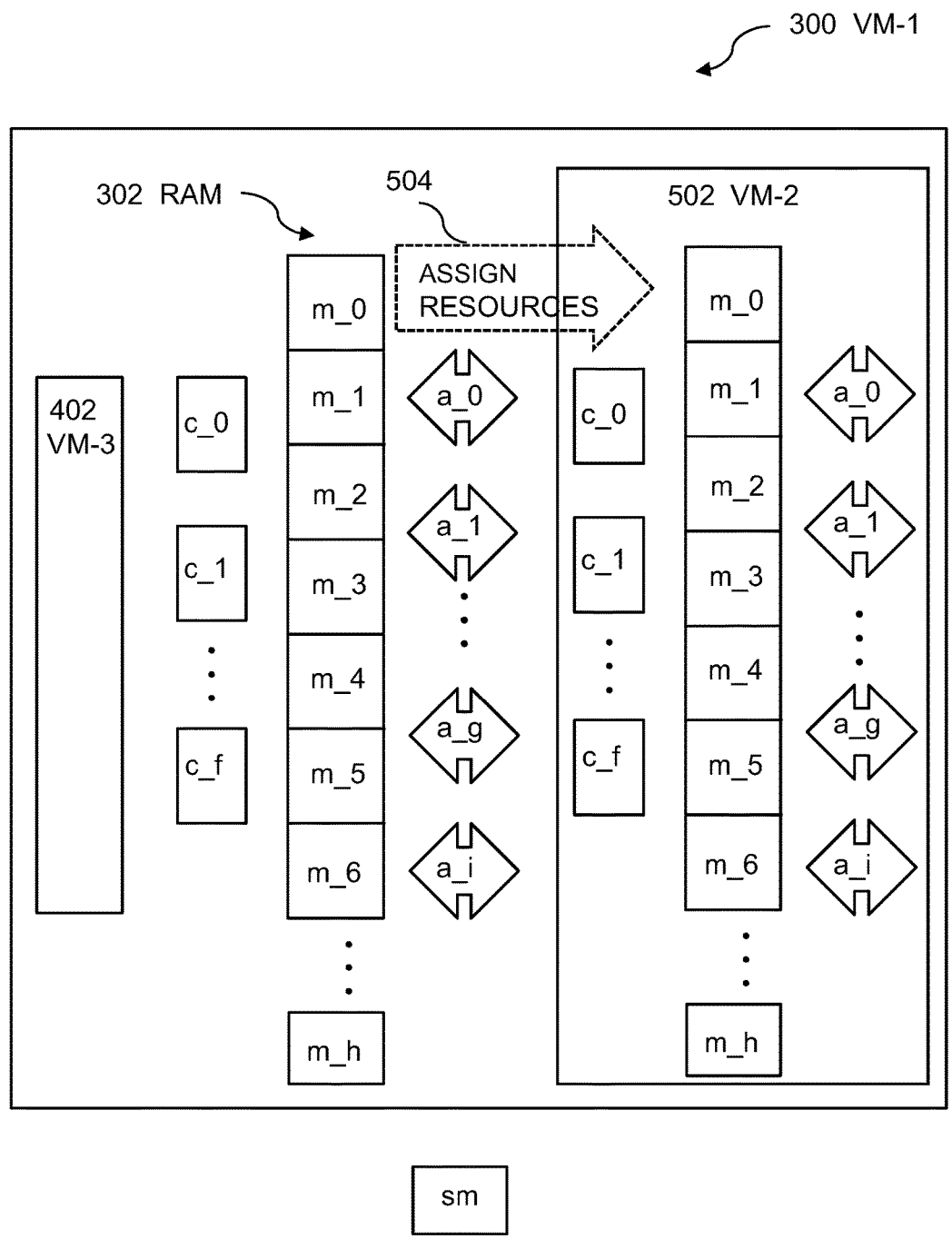
FIG. 5 shows an embodiment of an assignment of resources from a first virtual machine (VM) to a second embedded virtual machine (VM), in accordance with the present invention.

FIG. 5 shows an embodiment of an assignment of resources from first virtual machine (VM-1) 300 to second embedded virtual machine (VM-2) 502, in accordance with the present invention. In the shown example, the memory segment m_0 from virtual machine (VM-1) 300 is assigned to second embedded virtual machine (VM-2) 502, indicated by dashed arrow 504. It is assumed that first virtual machine (VM-1) 300 has crashed and second embedded virtual machine (VM-2) 502 obtains all resources of the crashed system. In a next step, the dumper program is loaded via the adapter a_0 into second embedded virtual machine (VM-2) 502, into the first memory segment m_0 of second embedded virtual machine (VM-2) 502. It may be noted that any status of a_0 has been saved in the spare memory sm before (as shown in FIG. 4).

Figure 6:
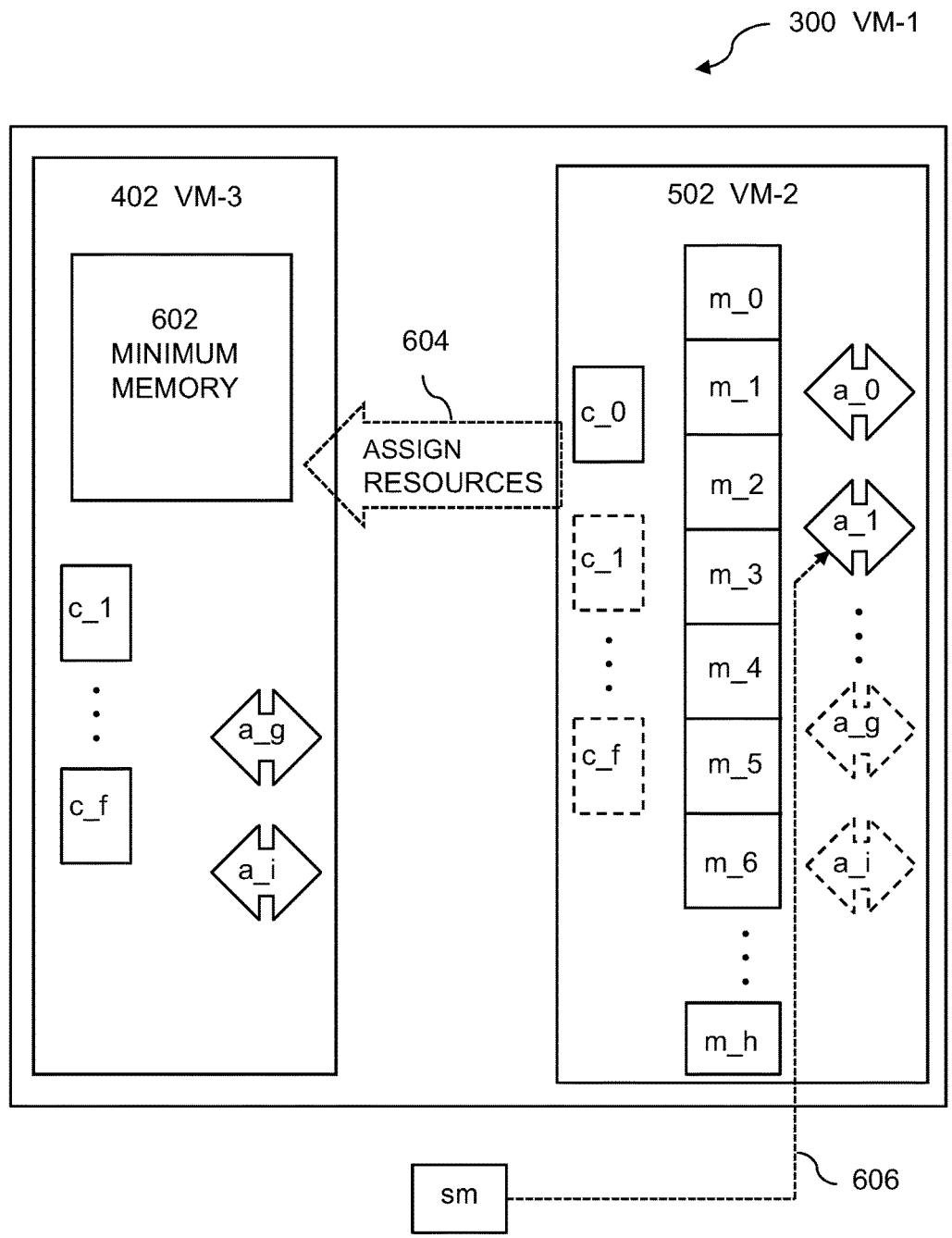
FIG. 6 shows an embodiment of dumping of data to the spare memory and an assignment of resources from a second embedded virtual machine (VM) to a third embedded virtual machine (VM), in accordance with the present invention.

FIG. 6 shows an embodiment of dumping of data to the spare memory and an assignment of resources from second embedded virtual machine (VM-2) 502 to third embedded virtual machine (VM-3) 402, in accordance with the present invention. FIG. 6 shows an embodiment of assigning a subset of CPUs (in particular c_1 to c_f) and adapters a_g to a_i from second embedded virtual machine (VM-2) 502 to third embedded virtual machine (VM-3) 402, as indicated by dashed arrow 604. There resources may not yet be sufficient to comply with the minimum defined set of required resources to start or boot third embedded virtual machine (VM-3) 402.

Also shown in FIG. 6 is that the data in the spare memory sm are now dumped (e.g., to a hard drive) via adapter a_1 (as shown by dashed line 606). It may be noted that, in general term, the saving or storing the statuses of the CPUs and adapters to the spare memory sm may not count as a dump. Only the storing of data of the memory segments and CPU statuses and adapter statuses to a storage medium (e.g., hard drive) outside the figures shown may be denoted as dump content. The storing the statuses or memory segment content stored in the spare memory may be denoted as intermediate saving.

Figure 7:
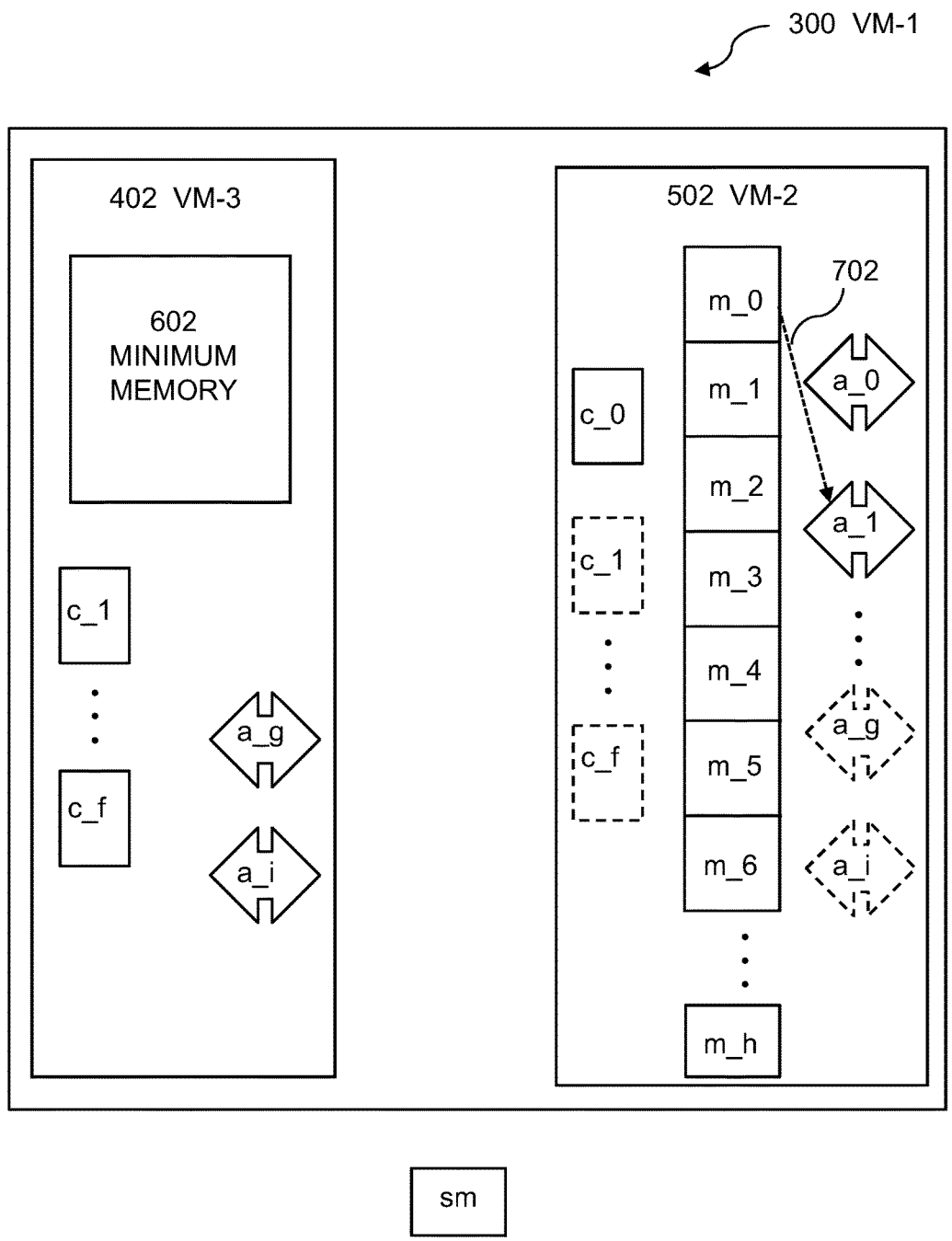
FIG. 7 shows an embodiment of dumping of data from a first memory segment, in accordance with the present invention.
Figure 8:
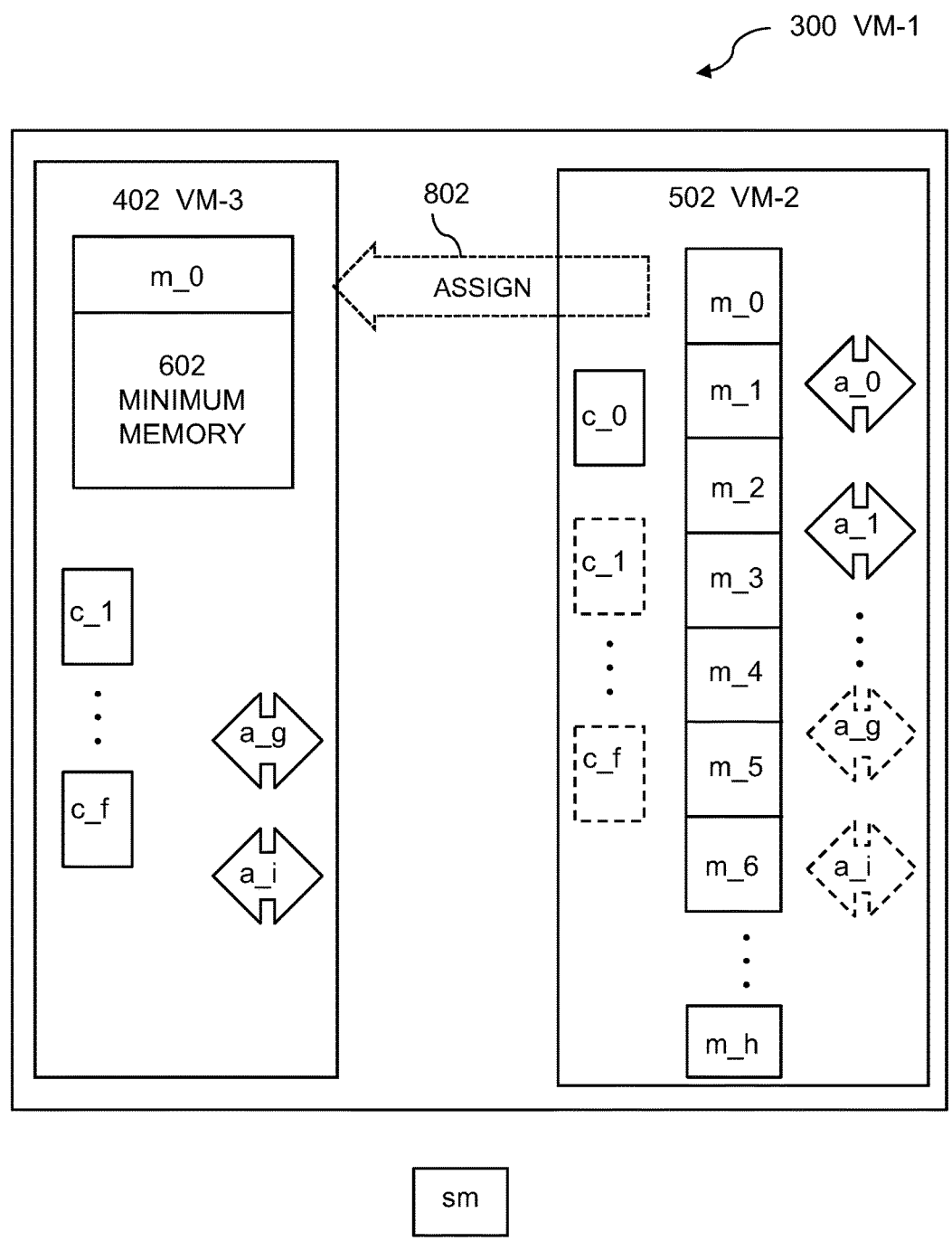
FIG. 8 shows an embodiment of assigning a first memory segment to a third virtual machine (VM), in accordance with the present invention.
Figure 9:
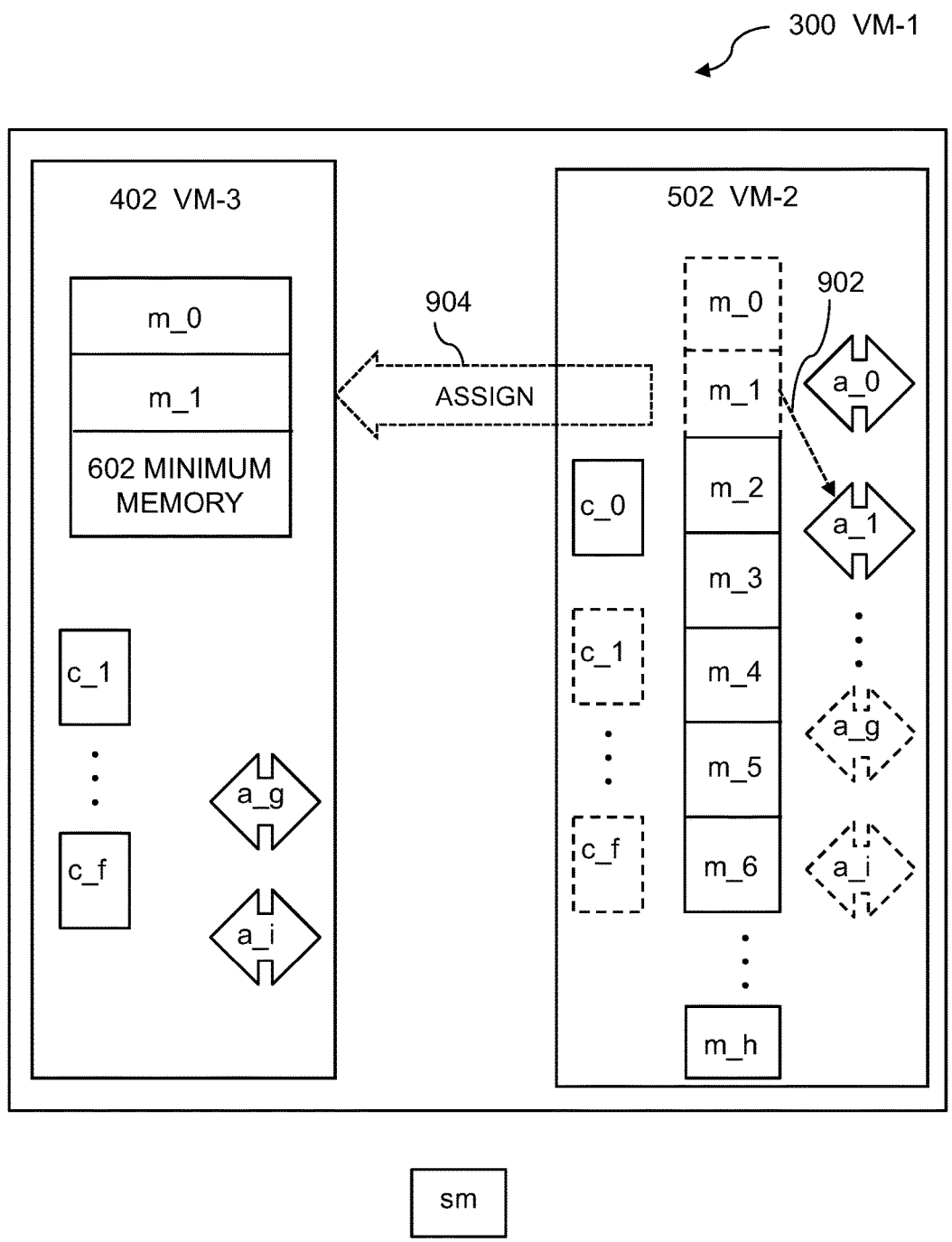
FIG. 9 shows a continued process of dumping of a memory segment and assigning, in accordance with one embodiment of the present invention.

FIG. 7 shows an embodiment of dumping of data from a first memory segment m_0 of second embedded virtual machine (VM-2) 502 via adapter a_1 (shown by 702 in FIG. 7). FIG. 8 shows an embodiment of assigning a first memory segment to third embedded virtual machine (VM-3) 402, in accordance with the present invention. When the memory segment m_0 has been dumped via adapter a_1, the memory segment m_0 is assigned or granted (indicated by the dashed arrow 802) to third embedded virtual machine (VM-3) 402. In FIG. 8 and FIG. 9, the minimum set of resources in third embedded virtual machine (VM-3) 402 is indicated; however, minimum memory 602 is not reached yet.

FIG. 9 shows a continued process of dumping of a memory segment and assigning, in accordance with one embodiment of the present invention. In FIG. 9, the content of the memory segment m_1 of second embedded virtual machine (VM-2) 502 is dumped by the dumper via adapter a_1, as indicated by arrow 902. Then, the memory segment m_1 is assigned to third embedded virtual machine (VM-3) 402 indicated by dashed arrow 904.

Figure 10:
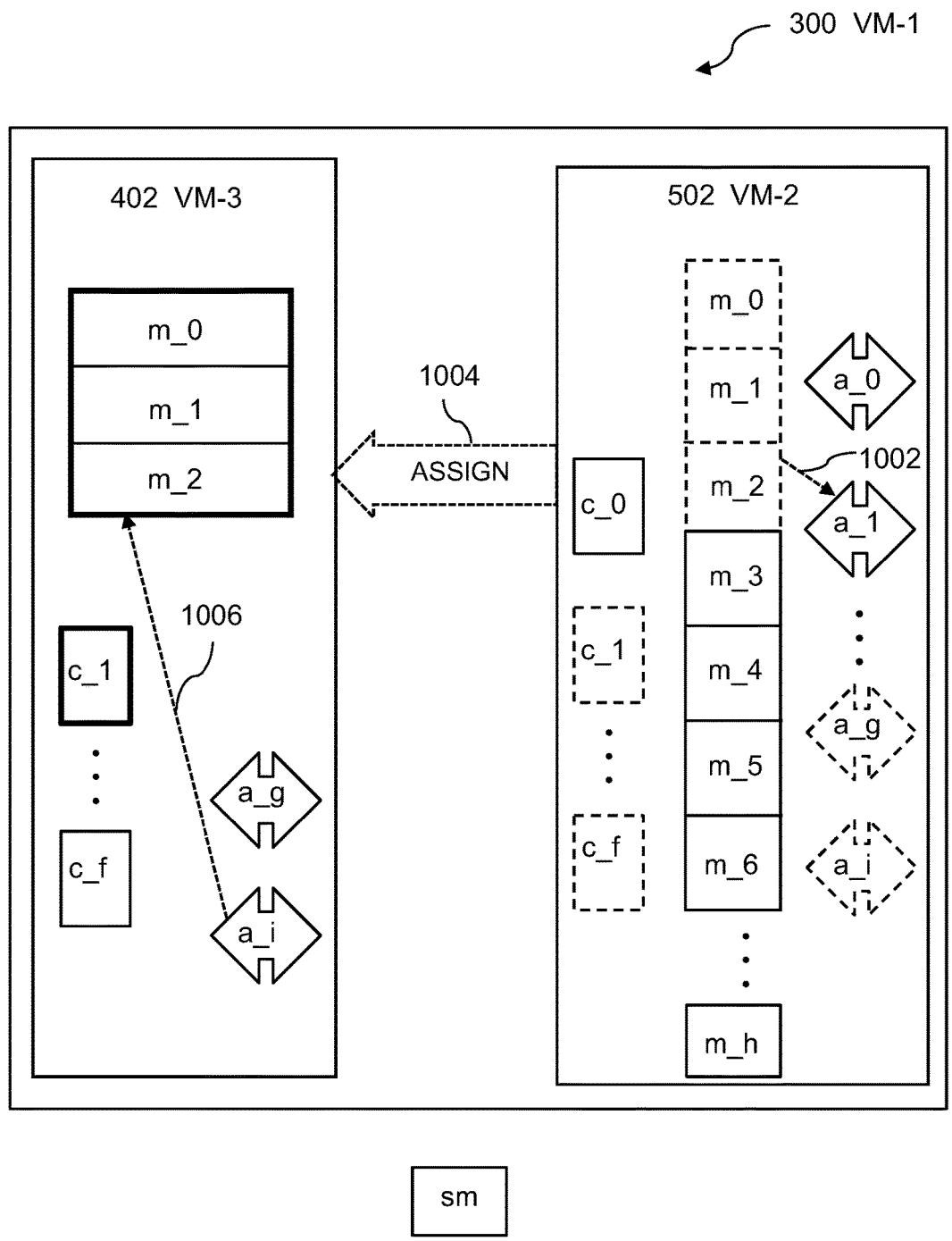
FIG. 10 shows an embodiment in which a minimum memory amount in virtual machine (VM) has been reached, in accordance with the present invention.

FIG. 10 shows an embodiment in which a minimum memory amount in virtual machine (VM) has been reached, in accordance with the present invention. That the minimum memory amount has been reached is indicated by a bold frame around the memory segments m_0, m_1, m_2 of third embedded virtual machine (VM-3) 402. It includes, in this example, memory segments m_0, m_1, m_2 after memory segment m_2 (which has also been dumped as shown by 1002) from second embedded virtual machine (VM-2) 502 has been assigned (as shown by 1004) to third embedded virtual machine (VM-3) 402. Generally, as soon as the content of a resource on second embedded virtual machine (VM-2) 502 has been dumped, the resource is assigned or granted to third embedded virtual machine (VM-3) 402.

If the minimum amounts of resources in third embedded virtual machine (VM-3) 402 have been reached by assignment from second embedded virtual machine (VM-2) 502, the CPU with the lowest index (in this example, c_1) starts the boot process for third embedded virtual machine (VM-3) 402 via adapter a_i; first potions of the operating system may be loaded to m_0, m_1, m_2 of third embedded virtual machine (VM-3) 402 (shown by 1006). The process of dumping and assigning may continue.

Figure 11:
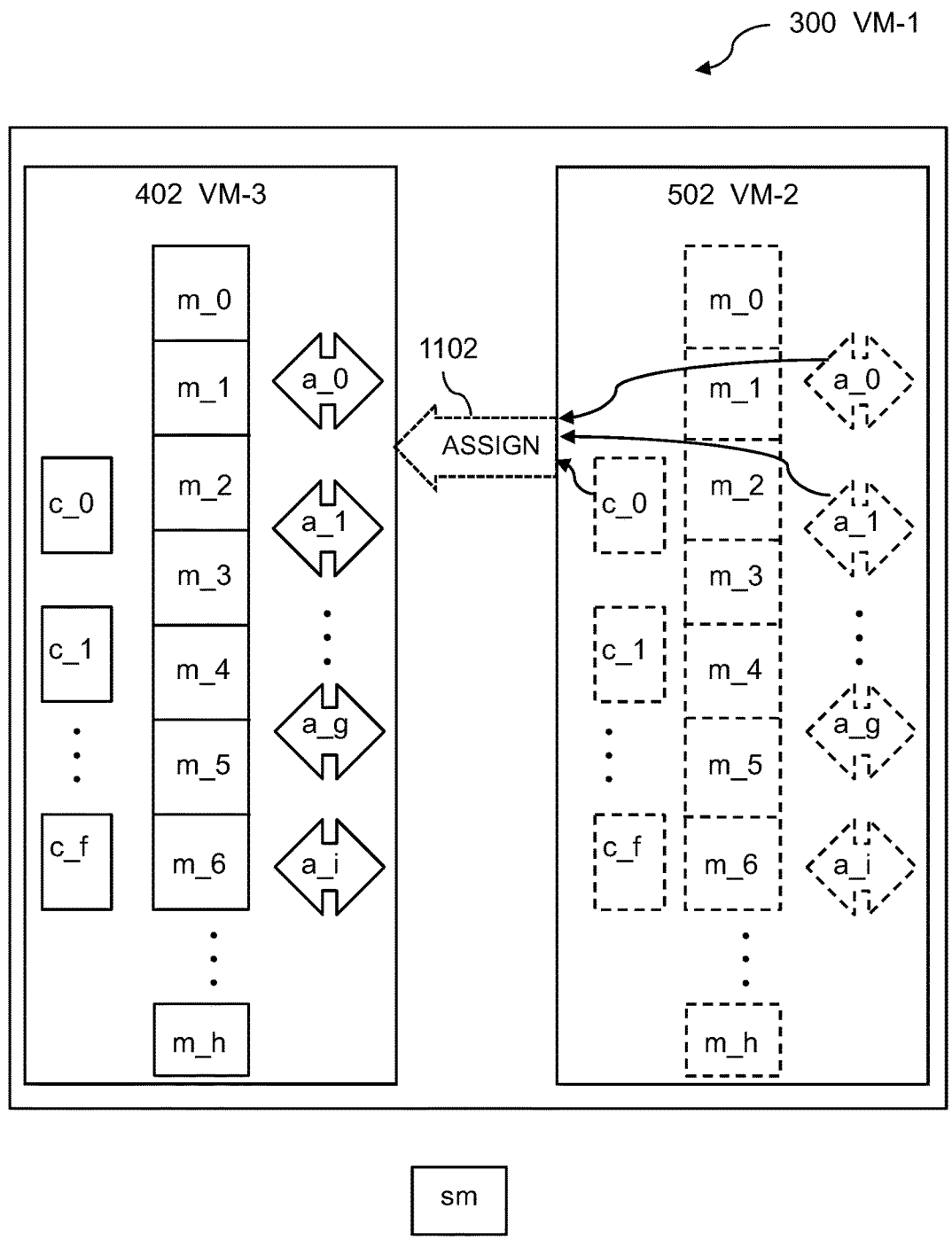
FIG. 11 shows an embodiment in which last resources of a second virtual machine (VM) are assigned to a third virtual machine (VM) and released, in accordance with the present invention.

FIG. 11 shows an embodiment in which last resources of second embedded virtual machine (VM-2) 502 are assigned to third embedded virtual machine (VM-3) 402 and released (shown by 1102), in accordance with the present invention. When the last memory segment m_h is cleared, the last remaining resources (here CPU c_0 and adapters a_0, a_1) are assigned from second embedded virtual machine (VM-2) 502 to third embedded virtual machine (VM-3) 402. Thereafter, second embedded virtual machine (VM-2) 502 may be terminated or dissolved.

Figure 12:
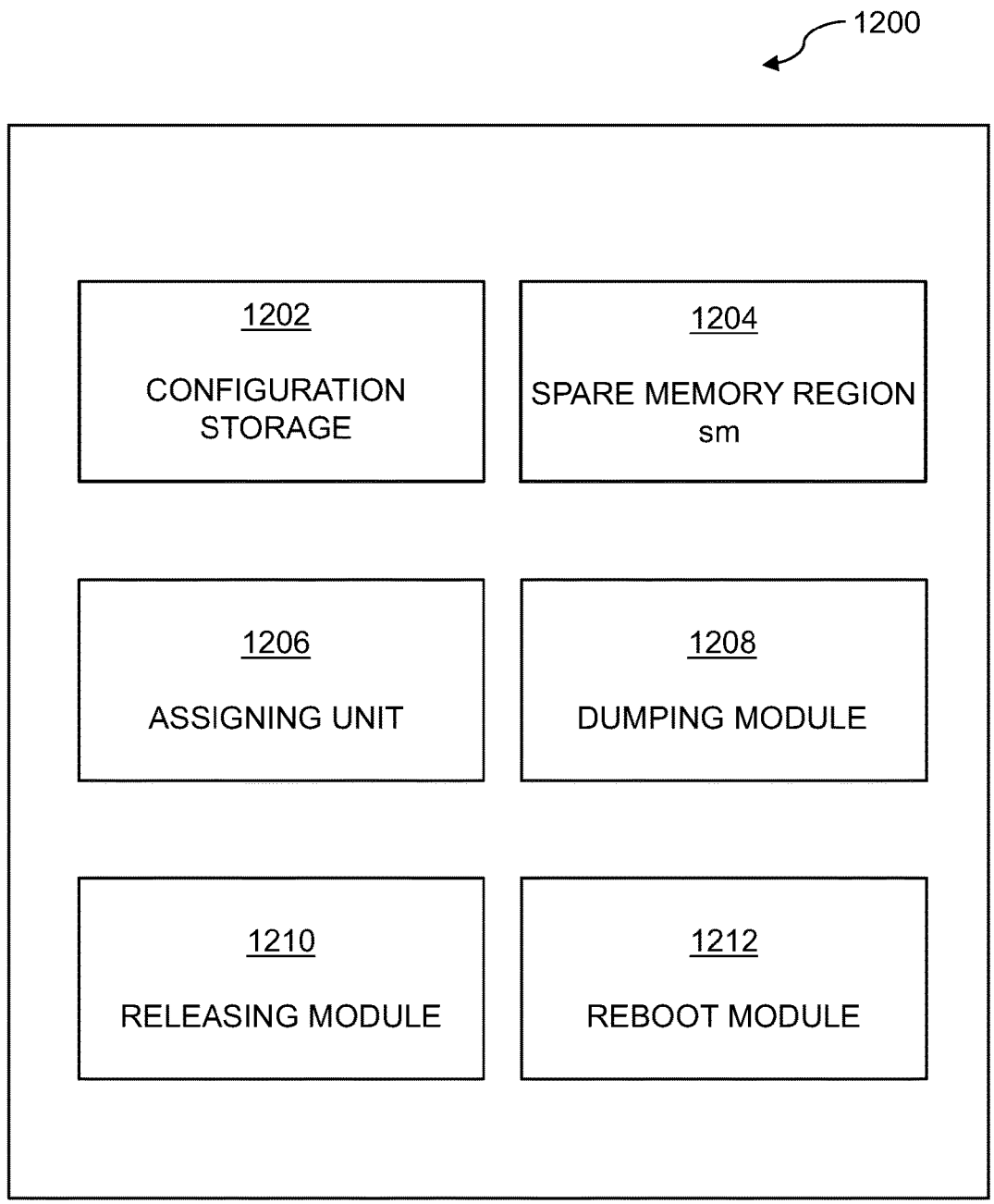
FIG. 12 shows a system for executing dumping of a main memory content and central processing unit (CPU) state values of a computer system, in accordance with one embodiment of the present invention.

FIG. 12 shows system 1200 for executing dumping of a main memory content and central processing unit (CPU) state values of a computer system, in accordance with one embodiment of the present invention. System 1200 comprises configuration storage 1202. Configuration storage 1202 is configured for storing a configuration list of a computer system that comprises a pre-defined set of dedicated resources for executing the dumping. Configuration storage 1202 is also configured for providing threshold values for a pre-defined set of minimum resources for executing a reboot of the computer system.

System 1200 also comprises spare memory region (sm) 1204. Spare memory region (sm) 1204 is configured for storing the configuration list and storing CPU states of a first CPU of a plurality of CPUs and I/O adapter states of a first I/O adapter of a plurality of adapters. System 1200 also comprises assigning unit 1206. Assigning unit 1206 is configured for assigning the pre-defined set of dedicated resources for executing the dumping. System 1200 also comprises dumping module 1208 and releasing module 1210. Releasing module 1210 is configured for releasing resources after their content has been dumped. System 1200 also comprises reboot module 1212. Reboot module 1212 is configured for starting the reboot of the computer system if the released resources exceed the threshold values for a pre-defined set of minimum resources for executing a reboot. Releasing module 1210 is also configured for continuing to release resources to the reboot process after their content has been dumped to the reboot process until the dumping is completed.

Figure 13:
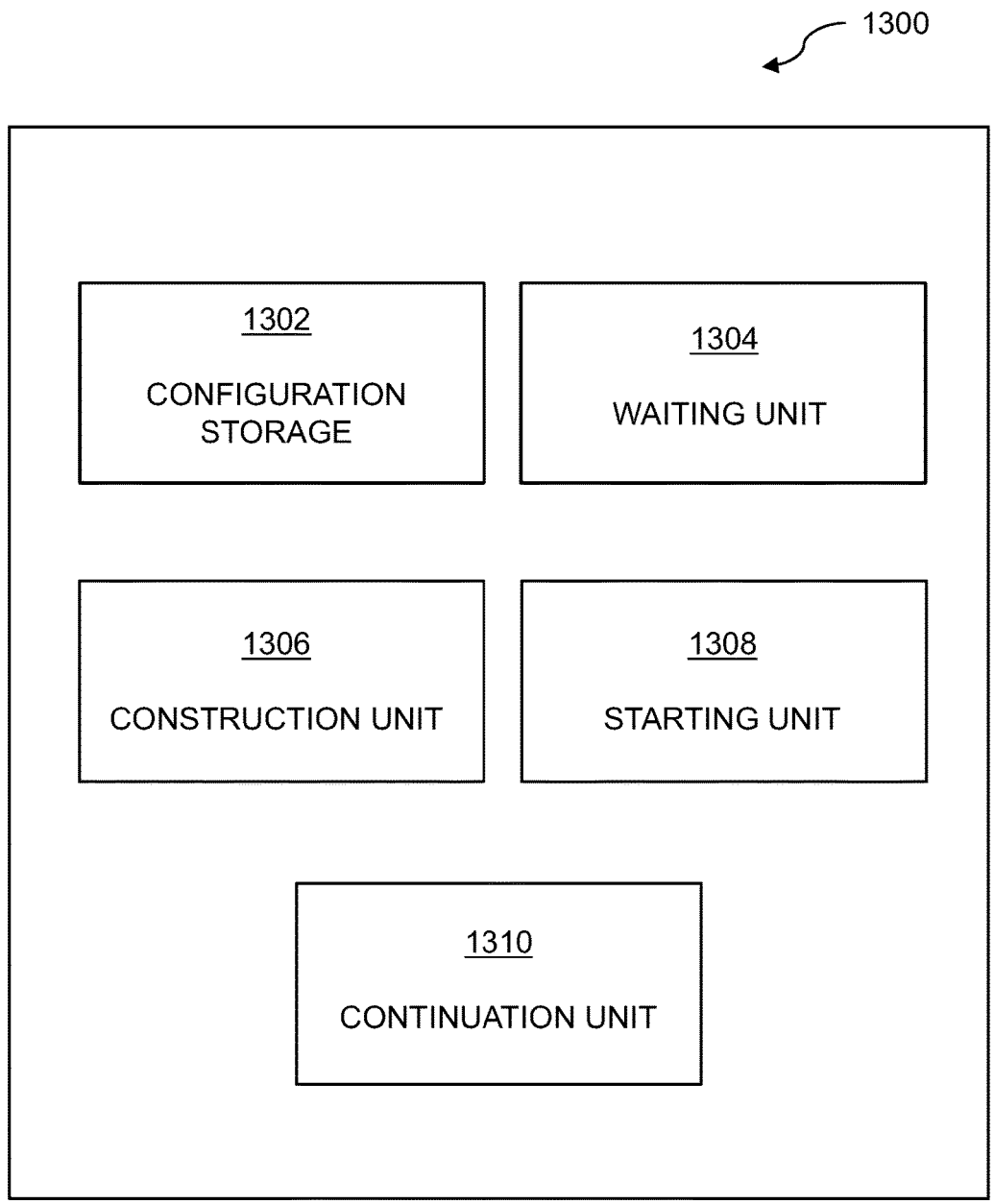
FIG. 13 shows a system for executing an adaptive boot process for a computer system, in accordance with one embodiment of the present invention.

FIG. 13 shows system 1300 for executing an adaptive boot process for a computer system, in accordance with one embodiment of the present invention. System 1300 for executing an adaptive boot process comprises configuration storage 1302. Configuration storage 1302 is configured for providing threshold values for a pre-defined set of minimum resources for executing the adaptive boot process of the computer system. System 1300 further comprises waiting unit 1304. Waiting unit 1304 is configured for waiting until the threshold value for the pre-defined set of minimum resources has been assigned to the virtual machine.

System 1300 further comprises construction unit 1306. Construction unit 1306 is configured for constructing a linear address space from memory resources. System 1300 further comprises starting unit 1308. Starting unit 1308 is configured for starting a CPU with a lowest index for an execution of the adaptive boot process. System 1300 further comprises continuation unit 1310. Continuation unit 1310 is configured for continuing assigning additional resources to the virtual machine until its resource specification is met.

Figure 14:
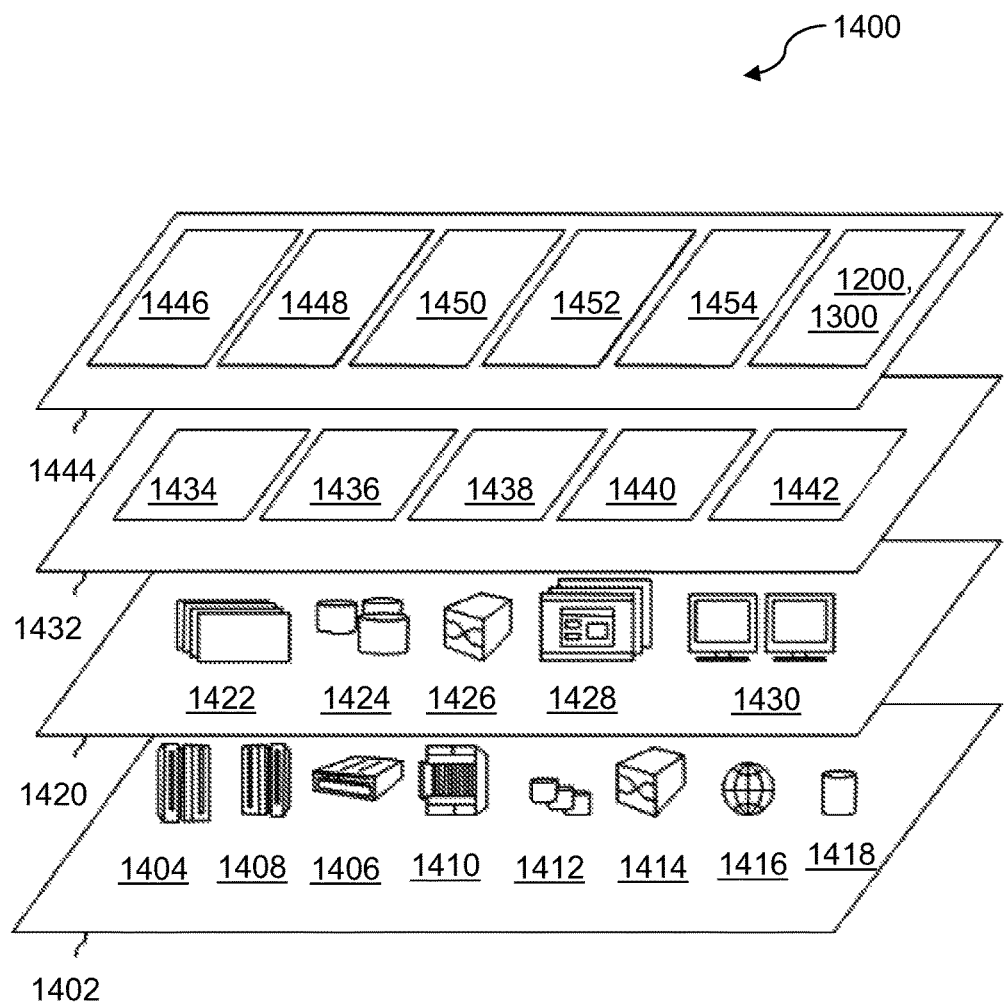
FIG. 14 shows a cloud computing environment, in accordance with one embodiment of the present invention.

FIG. 14 shows a cloud computing environment 1400 in which at least parts of the present invention may be deployed, in accordance with one embodiment of the present invention. A set of functional abstraction layers provided by cloud computing environment 1400 is shown. It should be understood in advance that the components, layers, and functions shown in FIG. 14 are intended to be only illustrative and embodiments of the invention are not limited thereto. As depicted, the following layers and corresponding functions are provided: hardware and software layers 1402 including hardware and software components. Examples of hardware components include mainframes 1404, servers 1406, RISC (Reduced Instruction Set Computer) architecture-based servers 1408, blade servers 1410, storage devices 1412, networks 1414, and networking components 1414. In some embodiments, software components include network application server software 1416 and/or database software 1418.

Virtualization layer 1420 provides an abstraction layer. Virtual entities may be provided virtual servers 1422, virtual storage 1424, virtual networks 1426 (including virtual private networks), virtual applications and operating systems 1428, and virtual clients 1430.

Management layer 1432 may provide the functions as described below. Resource provisioning 1434 provides dynamic procurement of computing resources and other resources that are utilized to perform tasks within the cloud computing environment. Metering and pricing 1436 provide cost tracking as resources are utilized within the cloud computing environment, and billing or invoicing for consumption of these resources. In one example, these resources may comprise application software licenses. Security provides identity verification for cloud consumers and tasks as well as protection for data and other resources. User portal 1438 provides access to the cloud computing environment for consumers and system administrators. Service level management 1440 provides cloud computing resource allocation and management such that required service levels are met. Service Level Agreement (SLA) planning and fulfillment 1442 provides pre-arrangement for, and procurement of, cloud computing resources for which a future requirement is anticipated in accordance with an SLA.

Workload layer 1444 provides examples of functionality for which the cloud computing environment may be utilized. Examples of workloads and functions which may be provided from this layer include mapping and navigation 1446, software development and lifecycle management 1448, virtual classroom education delivery 1450, data analytics processing 1452, transaction processing 1454, and system 1200 for executing a dump or system 1300 for executing an adaptive boot.

Figure 15:
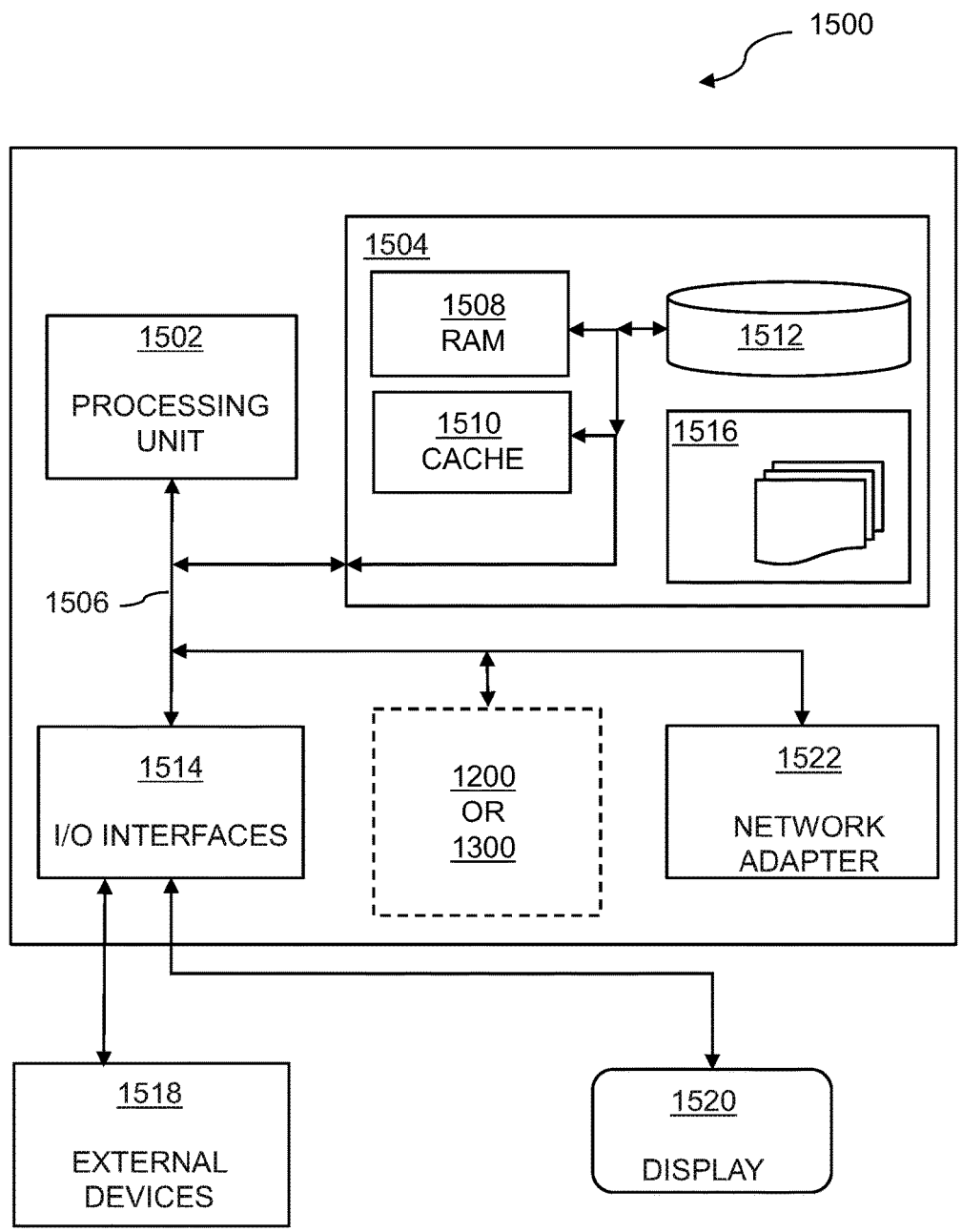
FIG. 15 shows components of a computing system comprising a system for executing the dumping or an adaptive boot system, in accordance with one embodiment of the present invention.

Embodiments of the invention may be implemented together with virtually any type of computer, regardless of the platform being suitable for storing and/or executing program code. FIG. 15 shows components of computing system 1500 comprising system for executing the dumping or an adaptive boot system, in accordance with one embodiment of the present invention. Computing system 1500 is suitable for executing program code related to methods 100 and 200.

Computing system 1500 is only one example of a suitable computer system and is not intended to suggest any limitation as to the scope of use or functionality of embodiments of the invention described herein. Regardless, computing system 1500 is capable of being implemented and/or performing any of the functionality set forth hereinabove. In computing system 1500, there are components, which are operational with numerous other general purpose or special purpose computing system environments or configurations. Examples of well-known computing systems, environments, and/or configurations that may be suitable for use with computing system 1500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computing system 1500 may be described in the general context of computer system-executable instructions, such as program modules, being executed by computing system 1500. Generally, program modules may include routines, programs, objects, components, logic, data structures, and so on that perform particular tasks or implement particular abstract data types. Computing system 1500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computing system 1500 is shown in the form of a general-purpose computing device. The components of computing system 1500 may include, but are not limited to, one or more processors or processing units 1502, system memory 1504, and bus 1506 that couples various system components including system memory 1504 to processor 1502. Bus 1506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computing system 1500 typically includes a variety of computer system readable media. Such media may be any available media that is accessible by computing system 1500, and it includes both, volatile and non-volatile media, removable and non-removable media.

System memory 1504 may include computer system readable media in the form of volatile memory, such as random access memory (RAM) 1508 and/or cache memory 1510. Computing system 1500 may further include other removable/non-removable, volatile/non-volatile computer system storage media. By way of example only, storage system 1512 may be provided for reading from and writing to a non-removable, non-volatile magnetic media (not shown and typically called a hard drive). Although not shown, a magnetic disk drive for reading from and writing to a removable, non-volatile magnetic disk (e.g., a floppy disk), and an optical disk drive for reading from or writing to a removable, non-volatile optical disk such as a CD-ROM, DVD-ROM or other optical media may be provided. In such instances, each can be connected to bus 1506 by one or more data media interfaces. As will be further depicted and described below, system memory 1504 may include at least one program product having a set (e.g., at least one) of program modules that are configured to carry out the functions of embodiments of the invention.

The program/utility, having a set (at least one) of program modules 1516, may be stored in memory 1504 by way of example, and not limitation, as well as an operating system, one or more application programs, other program modules, and program data. Each of the operating system, one or more application programs, other program modules, and program data or some combination thereof, may include an implementation of a networking environment. Program modules 1516 generally carry out the functions and/or methodologies of embodiments of the invention as described herein.

Computing system 1500 may also communicate with one or more external devices 1518 such as a keyboard, a pointing device, display 1520, etc.; one or more devices that enable a user to interact with computing system 1500; and/or any devices (e.g., network card, modem, etc.) that enable computing system 1500 to communicate with one or more other computing devices. Such communication can occur via Input/Output (I/O) interfaces 1514. Computing system 1500 may communicate with one or more networks such as a local area network (LAN), a general wide area network (WAN), and/or a public network (e.g., the Internet) via network adapter 1522. As depicted, network adapter 1522 may communicate with the other components of computing system 1500 via bus 1506. It should be understood that although not shown, other hardware and/or software components could be used in conjunction with computing system 1500. Examples, include, but are not limited to: microcode, device drivers, redundant processing units, external disk drive arrays, RAID systems, tape drives, and data archival storage systems, etc.

Additionally, system 1200 for executing dumping of main memory content and CPU states or system 1300 for executing an adaptive boot may be attached to bus 1506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for executing dumping of main memory content and central processing unit (CPU) state values of a computer system, the method comprising:
    providing a configuration list of the computer system, wherein the computer system comprises a pre-defined set of dedicated resources for executing the dumping;
    providing threshold values for a pre-defined set of minimum resources for executing a reboot of the computer system;
    loading the configuration list and storing CPU states of a plurality of CPUs and I/O adapter states of a plurality of I/O adapters in a spare memory region;
    assigning the pre-defined set of the dedicated resources for executing the dumping;
    starting the dumping;
    releasing ones of the dedicated resources after content of the ones of the dedicated resources has been dumped;
    starting a reboot process of the computer system, in response to determining that the ones of the dedicated resources exceed the threshold values for the pre-defined set of the minimum resources for executing the reboot process; and
    continuing to release others of the dedicated resources to the reboot process, after content of the others of the dedicated resources has been dumped to the reboot process, until the dumping is completed.

2. The computer-implemented method of claim 1, wherein the dedicated resources comprise memory segments, CPU cores, and I/O adapters.

3. The computer-implemented method of claim 1, wherein the computer system is a second virtual machine being executed as a sub-virtual machine in a first virtual machine.

4. The computer-implemented method of claim 3, wherein the second virtual machine is dissolved after the dumping is complete.

5. The computer-implemented method of claim 3, wherein the assigning the pre-defined set of the dedicated resources for executing the dumping comprises:
    releasing the pre-defined set of the dedicated of the first virtual machine from the second virtual machine;
    starting a third virtual machine within the first virtual machine for executing the dumping of the second virtual machine; and assigning the pre-defined set of the dedicated resources from the second virtual machine to the third virtual machine.

6. The computer-implemented method of claim 5, wherein the second virtual machine and the third virtual machine share a central processing unit.

7. The computer-implemented method of claim 1, wherein the reboot process and the dumping are executed in parallel.

8. A computer-implemented method for executing an adaptive boot for a computer system, the method comprising:

providing a configuration list for the computer system, wherein the computer system comprising a pre-defined set of minimum resources for executing the adaptive boot of the computer system;

starting the adaptive boot, in response to determining that the minimum resources are available for a boot process; and allocating continuously further resources to the boot process, until a full configuration according to the configuration list has been reached.

9. The computer-implemented method of claim 8, further comprising:

constructing a linear address space from memory segments allocated to the boot process.

10. The computer-implemented method of claim 9, further comprising:

resetting each memory cell of the linear address space before starting the adaptive boot.

11. The computer-implemented method of claim 9, further comprising:

starting a clearing process using resources not available to the boot process, the clearing process parallel to the boot process.

12. The computer-implemented method of claim 11, the clearing process comprising:

clearing the resources not available to the boot process and releasing cleared resources after the resources not available to the boot process being cleared; and assigning the cleared resources to the boot process.

13. The computer-implemented method of claim 8, wherein the minimum resources comprise a minimum amount of memory segments.

* * * * *